US008990832B2

(12) United States Patent
Viswanath et al.

(10) Patent No.: US 8,990,832 B2
(45) Date of Patent: Mar. 24, 2015

(54) PATTERN USING JSP-SERVLET-HELPER CLASSES FOR AN ORDER MANGEMENT SYSTEM

(75) Inventors: Sridatta Viswanath, Santa Clara, CA (US); David Chiu, Sunnyvale, CA (US)

(73) Assignee: Oracle America, Inc., Redwood City, CA (US)

(*) Notice: Subject to any disclaimer, the term of this patent is extended or adjusted under 35 U.S.C. 154(b) by 3687 days.

(21) Appl. No.: 10/032,849

(22) Filed: Oct. 29, 2001

(65) Prior Publication Data

US 2003/0125966 A1    Jul. 3, 2003

(51) Int. Cl.
G06F 15/16    (2006.01)
G06F 13/00    (2006.01)
G06Q 30/06    (2012.01)

(52) U.S. Cl.
CPC ...................................... G06Q 30/06 (2013.01)
USPC ............. 719/311; 719/330; 709/203; 705/1.1

(58) Field of Classification Search
USPC .................... 705/14, 22, 37, 80, 1, 64; 707/3; 726/26; 719/311, 330; 709/203
See application file for complete search history.

(56) References Cited

U.S. PATENT DOCUMENTS

| | | | | |
|---|---|---|---|---|
| 5,892,909 | A * | 4/1999 | Grasso et al. | 709/201 |
| 6,144,988 | A * | 11/2000 | Kappel | 709/202 |
| 6,609,108 | B1 | 8/2003 | Pulliam et al. | |
| 6,718,515 | B1 * | 4/2004 | Conner et al. | 715/207 |
| 6,757,708 | B1 * | 6/2004 | Craig et al. | 709/203 |
| 2001/0047311 | A1 | 11/2001 | Singh | |
| 2002/0023045 | A1 | 2/2002 | Feilbogen et al. | |
| 2002/0046240 | A1 * | 4/2002 | Graham et al. | 709/203 |
| 2002/0049749 | A1 * | 4/2002 | Helgeson et al. | 707/3 |
| 2002/0065693 | A1 | 5/2002 | Hattori et al. | |
| 2002/0069157 | A1 | 6/2002 | Jordan | |
| 2002/0077958 | A1 * | 6/2002 | Gardner et al. | 705/37 |
| 2002/0091533 | A1 | 7/2002 | Ims et al. | |
| 2002/0107699 | A1 | 8/2002 | Rivera et al. | |
| 2002/0116205 | A1 | 8/2002 | Ankireddipally et al. | |
| 2002/0120859 | A1 * | 8/2002 | Lipkin et al. | 713/200 |
| 2002/0133569 | A1 | 9/2002 | Huang et al. | |
| 2002/0156687 | A1 | 10/2002 | Carr et al. | |
| 2002/0174000 | A1 | 11/2002 | Katz et al. | |
| 2002/0184070 | A1 | 12/2002 | Chen et al. | |
| 2002/0184145 | A1 | 12/2002 | Sijacic et al. | |
| 2002/0188524 | A1 | 12/2002 | Shimizu | |
| 2003/0014265 | A1 * | 1/2003 | Landry et al. | 705/1 |

(Continued)

*Primary Examiner* — Candice D Wilson
*Assistant Examiner* — Kimberly Evans
(74) *Attorney, Agent, or Firm* — Robert C. Kowert; Meyertons, Hood, Kivlin, Kowert & Goetzel, P.C.

(57) ABSTRACT

A method and system for handling requests from a user and rendering a resulting page in HTML useful in effectuating aspects of an order management system, which reduces the redundancy in the underlying code required to effectuate the HTML page. An embodiment of the present invention modularizes various parts of an HTML page, effectuating the re-use of certain portions of code, advantageously reducing redundancy. In one embodiment, the present invention associates each HTML page with a form mapped to a servlet in a system backend. The servlet performs appropriate action based on corresponding user action. Each user action calls a set of re-usable helper class methods. Upon completion of processing, the servlet calls a render method. The active render method internally calls re-usable render methods in helper classes. These populate NTV data used by a JSP to generate a new HTML page accordingly.

22 Claims, 10 Drawing Sheets

(56) References Cited

U.S. PATENT DOCUMENTS

| | | |
|---|---|---|
| 2003/0061121 A1 | 3/2003 | Ouchi |
| 2003/0139975 A1 | 7/2003 | Perkowski |
| 2004/0210479 A1* | 10/2004 | Perkowski et al. ............. 705/14 |
| 2006/0059107 A1* | 3/2006 | Elmore et al. ................. 705/64 |
| 2007/0100967 A1* | 5/2007 | Smith et al. ................... 709/219 |

* cited by examiner

PATTERN USING JSP-SERVLET-HELPER CLASSES FOR AN ORDER MANGEMENT SYSTEM

TECHNICAL FIELD

The present invention relates to the field of generating and grouping purchase orders over computer networks such as Internet, wide area network, and local area network and any combinations thereof. More specifically, the present invention relates to the area of dynamically generating a design pattern using Java Server Page (JSP) servlet helper classes to implement a purchase order management systems within a business-to-business software acquisition framework.

BACKGROUND ART

Consumers need to organize and send purchase orders to suppliers for procurement purposes. Procurement is a process in which a buyer makes sure that a purchase order for a particular supplier is accurate and authorized. The organization and procurement of purchase orders are especially necessary for large retailers, wholesalers, manufacturers, and electronic companies who buy many different types of items from many different suppliers. Manufacturers need to replenish their parts in stock to keep up with their production schedule. Grocery retailers need to replenish their perishable items in a supermarket. Electronic companies need to buy parts for their newly designed products. Wholesalers need to purchase large quantities of goods from many different manufacturers. Furthermore, regular consumers who often shop over the Internet for discounted products from different suppliers also need to organize their purchasing records. All of these consumers can make use of a software program to organize and send purchase orders to suppliers so that billing statements are generated accurately and purchased items are received on schedule.

This procurement process is very important because it is costly for both consumers and suppliers if purchase orders are missing and get sent to the wrong consumers or if purchases are unauthorized. It takes time and money to track down missing purchase orders and correct inaccurate billing statements. Suppliers may loose customers if the procurement is not accurate. On the other hand, consumers such as grocery stores, retailers, wholesalers, and manufacturers may loose profits without accurate procurement because they have business schedules that depend upon the delivery of the purchased items. Therefore, consumers and suppliers need a software program which can help them in the organization and procurement of purchase orders.

This need is especially felt by both consumers and suppliers as the electronic commerce activities increase. In the recent years, the number of on-line consumers and suppliers has increased greatly, becoming commonplace. An on-line or an electronic consumer is a consumer who purchases items via such media as the Internet and World Wide Web (www). On-line purchasing becomes a convenient, cost effective, and timesaving method of buying. Over the Internet and via other on-line media, consumers can examine and select items that they want to purchase by interacting with web pages such as clicking and dragging items into an electronic shopping cart. The suppliers of the selected-and-purchased items then send these consumers a billing statement. On-line market is also a good method for suppliers to commercialize their products. It is economical and convenient for suppliers to post their catalogs on-line to advertise their products. Consequently, as the electronic commerce activities increase, the demand for a procurement software program also increases.

The boom of electronic commerce has brought about many software programs to assist users of procurement applications in different aspects of purchasing and procurement processes. One such aspect is the placing of orders via on-line modalities. In the placing of on-line orders, a user typically views a collection of items from a supply source on a computer monitor at a locale remote from the supply source. Typically, the ordering information is displayed to the user in a format such as a webpage, effectuated by coding in HyperText markup language (HTML). Requests from users which render webpages involved in the order process, and other related pages coded in HTML are thus necessary to enabling orders through contemporary electronic commerce media. In many cases, several, sometimes many webpages are required to display to the user, and interactively effectuate the user's provision through input, of an amount of information sufficient to complete an ordering action.

Typically, a number of screen pages related to the ordering process, sometimes many, contain information that is similar. For example, several webpages involved in the ordering process contain addresses, e.g., an interactive screen aspect displaying and effectuating input of various addresses necessary to effectuate an order transaction. Such addresses may include billing addresses, shipping addresses, sending addresses, paying addresses, and other addresses. In one exemplary format, such addresses may be formatted in a configuration such as billTo, shipTo, sendTo, payTo, etc., accompanied by interactive fields, wherein a user may input completely, or make changes to, address information. It is appreciated that other information may be similarly displayed and interacted with in screen pages effectuating on-line ordering actions.

The informational representation, e.g., display, as well as the informational inputs to the appropriate interactive fields thereon, have a number of similarities. These similarities, nevertheless, require expression through code used to generate the HTML pages. Conventionally, such similarities in screen pages typically necessitate redundancies in the code by which they are generated. Such redundancies render the conventional art problematic for a number of reasons.

Redundancy is inherently burdensome to systems, such as computer systems utilized in the implementation and operation of orders and other aspects of electronic commerce. Such burdens reduce system efficiency, speed, and appropriate capacity unavailable for other functions. In this respect it is wasteful. It delays and may deter system operations and the commerce effectuated thereby. Further, code redundancy adds complexity, expense, and propensity to error to the code used in order modules. Such burdens are realized at several levels. First, programming is encumbered by the tedium inherent in redundancy. Second, both debugging and implementation is hampered by the complexity and sheer volume of code written to be so redundant. Third, user operations are made more complicated, tedious, and difficult by having to use the redundant code to generate HTML pages needed to implement their orders.

SUMMARY OF THE INVENTION

What is needed is a method and/or system for handling requests from a user and rendering a resulting page in HyperText markup language (HTML). What is also needed is a method and/or system for handling requests from a user and rendering a resulting page in HTML, which is useful in effectuating aspects of an order management system. Further, what is needed is a method and/or system for handling requests from a user and rendering a resulting page in HTML useful in effectuating aspects of an order management system, which reduces the redundancy in the underlying code required to effectuate the page.

Embodiments of the present invention implement a method and system for handling requests from a user and rendering a resulting page in HTML. Embodiments of the present invention also implement a method and system for handling requests from a user and rendering a resulting page in HTML, which is useful in effectuating aspects of an order management system. Further, embodiments of the present invention implement a method and system for handling requests from a user and rendering a resulting page in HTML useful in effectuating aspects of an order management system, which reduces the redundancy in the underlying code required to effectuate the page.

In one embodiment, the present invention modularizes various parts of an HTML page. In the present embodiment, modularization of the HTML page effectuates the reuse of certain portions of code. Advantageously, this re-use of code portions needed to implement the HTML page reduces redundancy, which would otherwise be inherent in the coding. Reduction in coding redundancy achieves significant reductions in burdens imposed on implementing systems, such as computer systems implementing the order operations and other aspects of electronic commerce. This achievement improves the efficiency of these implementing systems, increasing the speed with which they can handle the order operations, and their capacity for data handling and other functions.

In one embodiment, the present invention associates each HTML page with an electronically based form. In one embodiment, the form associated with the HTML page is mapped to a servlet in a system backend. The form associated with the HTML page may also be mapped to any other similarly effective Java application running in a web server or application server providing server-side processing accessing a database and/or performing electronic commerce processing.

The servlet (or other similarly effective Java application running in a web server or application server providing server-side processing accessing a database and/or performing electronic commerce processing) performs appropriate action based on a corresponding user action on the front side, e.g., at a computer work station or similar browser client agent, such as certain keyboard strokes or graphical user interface (GUI) actions. In one embodiment, each user action calls a set of helper class methods. Advantageously, the methods in these helper classes are re-usable for various other actions, as well.

Upon completion of processing associated with the corresponding operation of the helper classes, the servlet (or other similarly effective Java application running in a web server or application server providing server-side processing accessing a database and/or performing electronic commerce processing) calls a render method. The render method called correspondingly creates a new page in HTML, based on the processing of the previous screen, by which the user actions were inputted.

In one embodiment, the active render method internally calls render methods in helper classes. The render methods in the helper classes so called populate data in a name value pair. These name value pairs are utilized by Java server pages (JSP's) for generating a new HTML page, one which will effectuate the order operation, accordingly. Advantageously, the render methods in helper classes are re-used in a number of other places.

These and other advantages of the present invention will become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
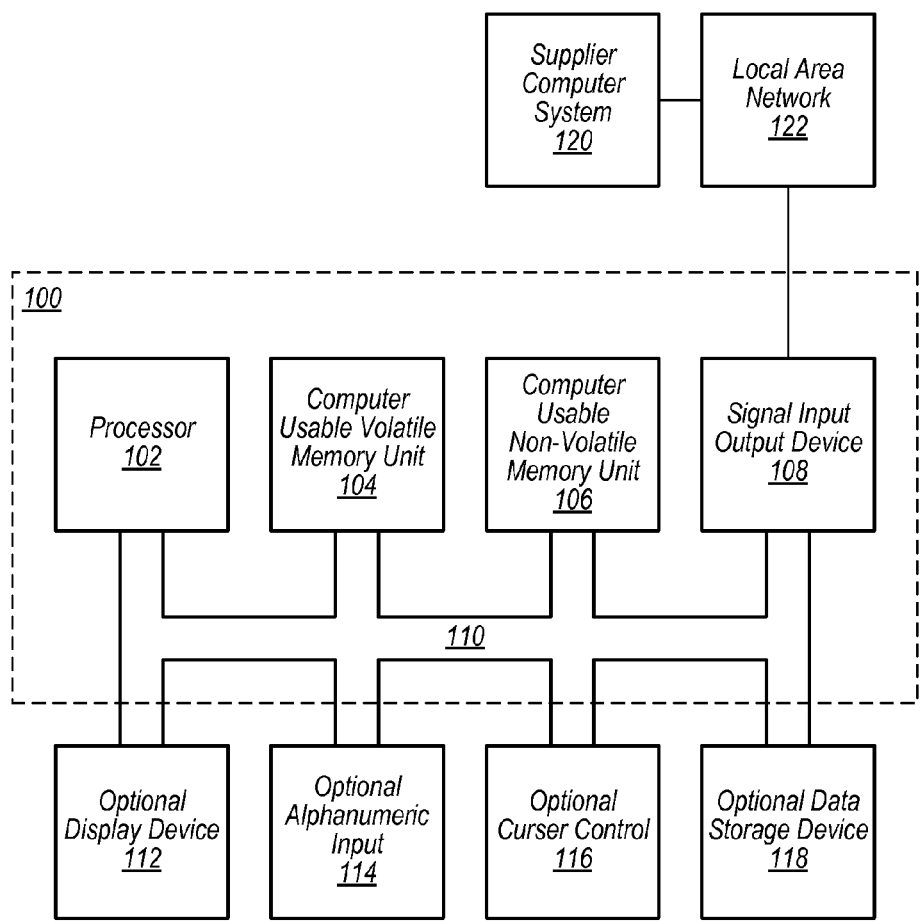
FIG. 1 illustrates a general purpose computer system, upon which embodiments of the present invention may be implemented.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "inputting," "applying," "calling," "drafting," "generating," "processing," "performing," "populating," or the like, refer to the action and processes of a computer system, or similar electronic computing device, that manipulates and transforms data represented as physical, e.g., electronic quantities within the communications and computer systems' registers and memories into other data similarly represented as physical quantities within the computer system memories or registers or other such information storage, transmission, or display devices.

Further, an embodiment of the present invention may be discussed in terms of a process, e.g., the implementation and/or execution of a method. For example, FIG. 7, a flowchart, and the text rendering an accompanying discussion thereof, refers to a process 700 of performed in accordance with one embodiment of the present invention for generating a webpage or similar page coded in HyperText Markup Language, hereinafter referred to in abbreviation as HTML. Flowchart 700, and the text rendering an accompanying discussion thereof, includes exemplary processes of an embodiment of the present invention which, in one embodiment, are carried out by processors and electrical/electronic components under the control of computer readable and computer executable instructions.

The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific processes are disclosed in FIG. 7 and its process 700, and the text rendering an accompanying discussion thereof, such processes are exemplary. That is, embodiments of the present invention is well suited, to performing various other processes or variations of the processes recited in FIG. 7, and the text rendering an accompanying discussion thereof. Within the present embodiment, it should be appreciated that the process of flowchart 7 and its process 700, and the text rendering an accompanying discussion thereof, may be performed by, e.g., executed upon software, firmware, and/or hardware or any combination of software, firmware, and/or hardware.

Exemplary Computer System Platform

FIG. 1 is a block diagram of one embodiment of an exemplary computer system 100 that can be used, for example, as a platform for embodiments of the present invention. System 100 is well suited to be any type of computing device (e.g., browser client computer, server computer, portable computing device, etc.). Within the following discussions of the present invention, certain processes and are discussed (e.g., process 600) that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described in detail below. In one embodiment, the computer may be controlled to perform these actions, functions, and behaviors under the direction of a program contained within and/or upon a computer readable medium. The computer readable medium may be a combination of several media elements, and may include any extant media and/or media yet to be developed. Examples of such media include magnetically and electromagnetically implemented media such as disc drive, e.g., hard drive units, and diskettes, Zip drives, magnetic tape, and other portable media. Other examples of such media include optically and electro-optically implemented media such as a compact disc (CD), digital video disc (DVD), and the like.

Computer system 100 of FIG. 1 comprises an address/data bus 110 for communicating information, one or more central processors 102 coupled with bus 110 for processing information and instructions. Central processor unit 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices (I/O circuit) 108 coupled with bus 110 for enabling system 100 to interface with other electronic devices. The communication interface(s) 108 of the present embodiment may include wired and/or wireless communication technology. For example, in one embodiment of the present invention, the communication interface 108 is a serial communication port, but could also alternatively be any of a number of well-known communication standards and protocols.

Optionally, computer system 100 can include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics.

It will be appreciated by one of ordinary skill in the art that computer 100 can be part of a larger system. For example, computer 100 can be a server computer that is in data communication with other computers. As illustrated in FIG. 1, computer 100 is in data communication with a supplier computer system 120 via a network 122, such as a local area network (LAN) or the Internet.

Exemplary Client Computer-Server Relationship

Figure 2:
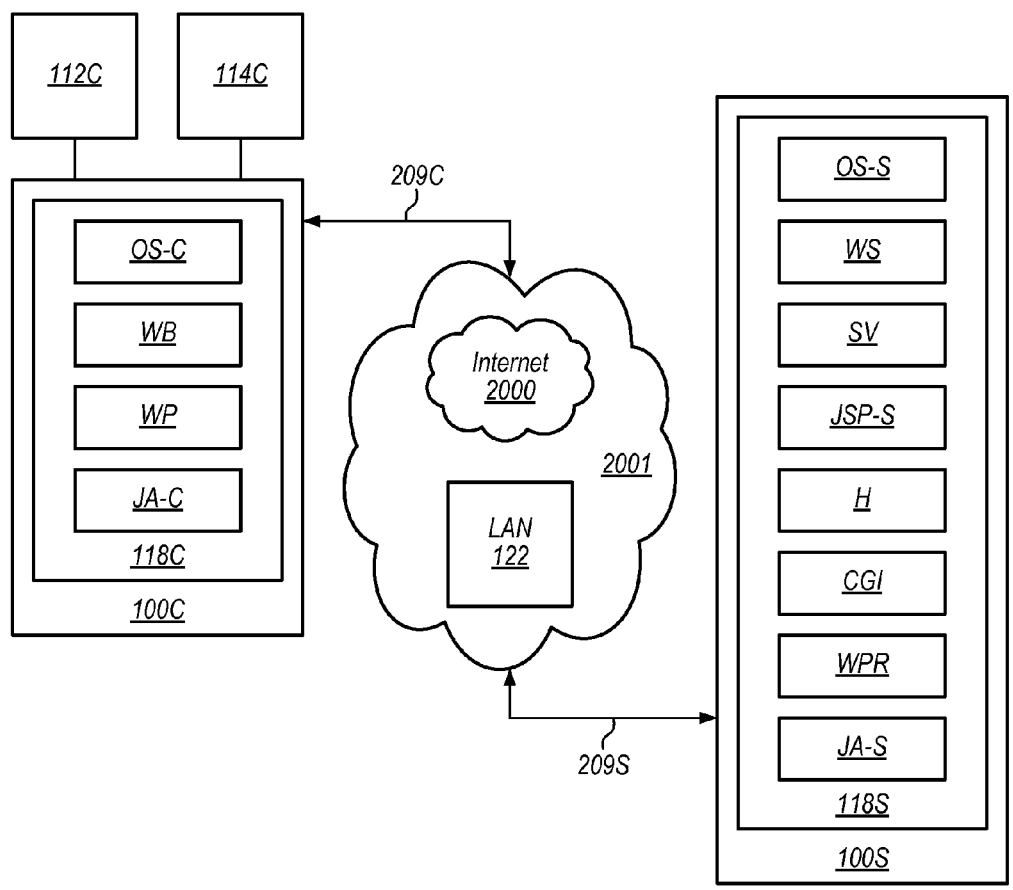
FIG. 2 is a block diagram showing the relationship between client computers and servers, as well as an organization of functional elements within each, through which embodiments of the present invention may be implemented.

FIG. 2 is a block diagram showing the relationship 200 between a client computer 100C and a server, e.g., a server computer 100S, as well as an organization of functional elements within each, through which embodiments of the present invention may be implemented. Client computer 100C and server 100S are each platforms embodying various implementations of a computer system (e.g., computer system 100; FIG. 1).

Client platform 100C may be a browser computer, in one embodiment. The client computer 100C may be a personal computer (PC), a work station computer, a network computer, or any other computer platform implementing any viable operating system (OS) OS-C. In the present exemplary implementation, client computer system 100C is a PC with a monitor 112C and a keyboard 114C. OS OS-C may be a SunOS™, Windows™, MAC™, products of Sun Microsystems, Inc. of Sunnyvale, Calif., Microsoft, Inc. of Redmond, Wash. and Apple Computer Corp. of Cupertino, Calif., respectively, or any other OS.

Client computer 100C may also deploy a web browser WB. In the present embodiment, web browser WB deploys a Java virtual machine (JVM), or another viable Java interpreter. The JVM implemented by web browser WB utilizes software that converts the Java intermediate language, e.g., bytecode, into machine language and executes the instructions promulgated within it. It is appreciated that the present invention is well suited to implementation on any equivalent platform, including one with a web browser WB deploying any JVM version, such as for example, JavaSoft™ JVM versions by Sun Microsystems, Inc. and Microsoft Virtual Machines by Microsoft, Inc. JVM deployed in web browser WB effectuates the execution of Java applets JA-C.

It is appreciated that, in one embodiment, OS OS-C and web browser WB may be deployed wholly or partially upon a data storage system 118C. Data storage system 118C may be a hard disc drive of any viable architecture, or any other viable data storage system.

A communicative coupling medium 209C, which in various embodiments may be any wire-deployed and/or wireless communication modality, interconnects client computer 100C via a signal input/output (I/O) device (e.g., I/O device 108; FIG. 1) to a network milieu 2001. Network milieu 2001 may be a network of any viable type, and may include a LAN 122 and/or the Internet 2000. It is appreciated that network milieu 2001 may include any other communicative network such as wide area networks (WAN), local intranets, and/or other network configurations. A communicative coupling medium 209S interconnects server 100S to network milieu 2001. Communicative coupling medium 209S may, in various embodiments, may be identical, similar, or different from communicative coupling medium 209C. Communicative coupling medium 209S may, in various embodiments, be any wire-deployed and/or wireless communication modality.

Server platform 100C may be a web server, in one embodiment. The server computer 100S may be a server or any other computer platform implementing any viable server function enabling OS OS-S. OS OS-S may be SunOS™, UNIX, NT™ by Microsoft Corp., or any other OS that effectuates a computer platform to implement a server function.

Server 100S deploys a web server WS. Web server WS is a software implementation that uses HyperText Transfer Protocol (HTTP) to serve up documents in HTML, along with associated files and scripts, upon request of a client, e.g., client computer 100C, specifically web browser WB.

Server 100S also deploys a Java servlet SV. Servlet SV, a Java application, runs, in one embodiment, within web server WS to provide server-side processing, e.g., such as for accessing a database and/or to perform electronic commerce processing related tasks. In one embodiment, server 100S may also deploy, or deploy instead of servlet SV, a Common Gateway Interface (CGI) script.

Server 100S further deploys a Java Server Page (JSP) JSP-S. JSP JSP-S provides a programming vehicle to enable server 100S to display dynamic web page or other HTML page content. JSP JSP-S, in one implementation, is an HTML page with embedded Java source code. JSP JSP-S is executed in web server WS. Its embedded HTML effectuates a page architecture for a document, which is returned to the client, e.g., client computer 100C, specifically web browser WB. Simultaneously or nearly so, the Java content of JSP-S provides the processing capabilities, e.g., to deliver a query to an electronic commerce repository and/or to another database, and "fill in the blanks" in the document with the fetched results. JSP JSP-S is compiled into bytecode, e.g., into a servlet (e.g., servlet SV) upon recognition by server 100S. Importantly, JSP JSP-S can also call helper classes H, also deployed by server 100S, to provide additional processing.

In the present exemplary implementation, server computer system 100S has a data storage system 118S. Data storage system 118C may be a data storage system of any viable, high speed architecture, such as a hard disc drive, CD, and/or DVD. It is appreciated that, in one embodiment, data storage system 118S may deploy any of the other functionalities of server 100S, including OS OS-S, web server WS, servlet SV, JSP JSP-S and/or CGI script CGI, and helper classes H. Data storage system 118S may also deploy web pages WPR, which may reference Java applets.

Figure 3:
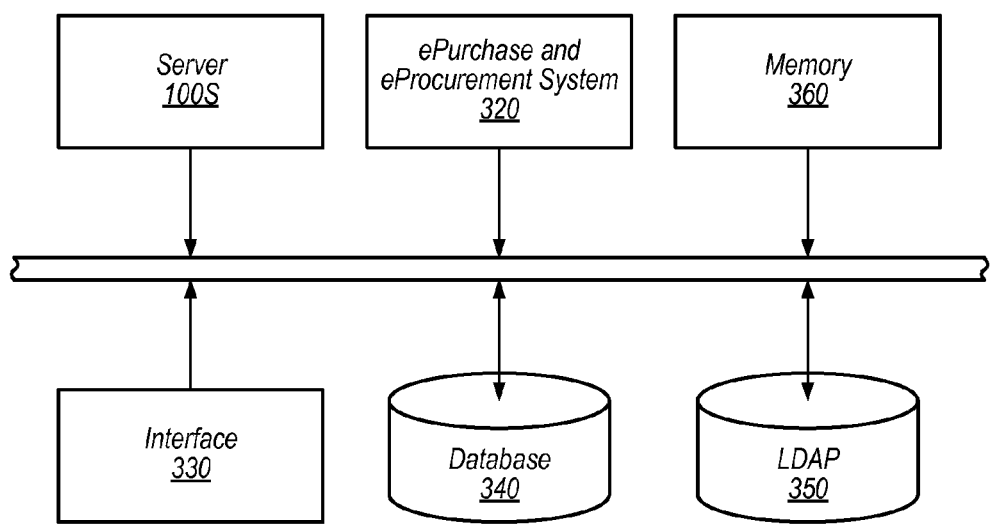
FIG. 3 is a block diagram of one embodiment of the e-commerce environment in which embodiments of the present invention may be implemented.

Thus, server 100S is well suited to functionally interact in and with an electronic commerce environment (e.g., e-commerce environment 300; FIG. 3).

Exemplary E-Commerce Environment

FIG. 3 depicts an electronic commerce, e.g., e-commerce procurement and purchasing environment 300 of one embodiment of the present invention. The on-line purchasing and procurement environment 300 shown in FIG. 3 comprises computer server 100S, e-Purchase and e-Procurement system 320, Interface 330, Database 340, Directory 350 and Memory 360 coupled a common communication channel.

Server 100S is coupled to provide a e-platform application server for the e-procurement and e-purchasing environment of the present invention. Server 100S provides a user a single sign-on facility to the e-Procurement system 320 of the present invention, as well as the ability to customize the e-Procurement system 320. Server 100S also provides scalability and high availability to the user.

The e-Procurement system 300 is coupled to server 100S to provide an on-line centralized control for buying goods and services for enterprise operations. The e-Procurement system 320 further provides a business-to-business application for purchasing and procurement professionals within an organization in the enterprise. The e-Procurement system 320 is extensible to allow non-professional purchasing and procurement persons with the enterprise to purchase consumables such as office supplies, small office equipment and services from suppliers on the Internet.

Still referring to FIG. 3, Interface 330 couples to e-Procurement system 320 to provide a foundation for order submissions, and the communication between a customer and legacy systems and the e-procurement system 320 of the present invention.

Interface 330 further supports secure transmission of data over public and private networks, as well as the storage of documents, tracking of services and the management of tasks. In one embodiment of the present invention, Interface 330 supports the American National Standards Institute (ANSI) ASCII 12 and other communication interface standards. Interface 330 further supports the use of graphical tools for mapping, translation and conversion of any file format such as Electronic Data Interface (EDI) to a different file format. Interface 330 may be related to communicative coupling media 209S and/or media 209C (FIG. 2).

Database 340 is coupled to the e-Procurement system 300 to provide ordering and catalog information to the user. Database 340 may be an "off-the-shelf" software product such as an Oracle database software developed and sold by Oracle corporation of Redwood City, Calif. In the present invention, data is stored in database 340 in the form of data objects with associating data attributes.

In the e-Procurement system of the present invention, Database 340 provides an intermediary storage facility of catalog information where orders originated by a user are stored. In-bound orders are processed by e-Procurement system 320 using order information retrieved from the catalogs stored in database 340. The e-Procurement system 320 transmits out-bound order documents based on available catalog information from a supplier to the buyer.

Directory 350 ("LDAP") is coupled to the e-Procurement system 320 to store membership information of users of the e-Procurement system 320. Directory 350 also stores information on the suppliers, as well as location information of buyers and seller in order to facilitate an effective and efficient communication of order and supply information between enterprises.

Memory 360 is coupled to the server 100S to store transient copies of purchase requisitions stored in database 340. A purchase order requisition of catalog information stored in memory 360 has a one-to-one correlation with data objects stored in database 340. Information stored in memory 360 are stored as data objects or the like in a manner well known in the art. Memory 360 may be related to mnemonic functionalities in server 100S such as RAM (e.g., RAM 106; FIG. 1).

Exemplary Programming Structure Hierarchy

Figure 4:
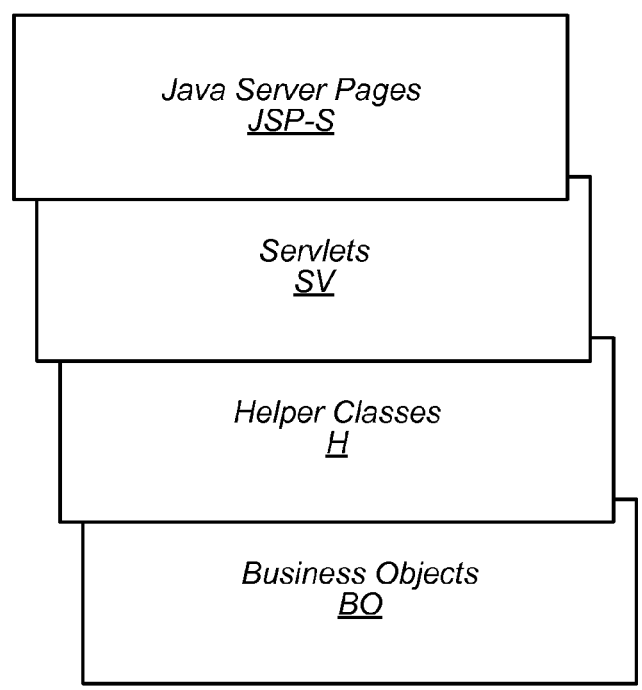
FIG. 4 illustrates a hierarchy of programmatic applications in which embodiments of the present invention may be implemented.

Referring now to FIG. 4, a hierarchy 400 of programming vehicles applied to effectuate various embodiments of the present invention herein are described from the highest order down to the lowest order.

At the highest order are JSP's, such as JSP-S. JSP JSP-S provides a programming vehicle to enable a server (e.g., server 100S; FIG. 2) to display dynamic web page or other HTML page content. JSP JSP-S, in one implementation, is an HTML page with embedded Java source code. JSP JSP-S may be executed in a web server (e.g., web server WS; FIG. 2). The embedded HTML code within JSP JSP-S effectuates a page architecture for a document, which is returned to the client (e.g. client computer 100C; FIG. 2), specifically, to its web browser (e.g., web browser WB; FIG. 2). The Java content of JSP JSP-S provides its processing capabilities. For example, in an embodiment of the present invention, the Java content of JSP JSP-S effectuates the delivery of a query to an electronic commerce repository and/or to another database (e.g., LDAP 350, database 340, respectively; FIG. 3), and to "fill in the blanks" in the document with the fetched results.

It is appreciated that the present invention is well suited to the application of functionalities similar to those by which an embodiment of the present invention is described and explained herein. The present invention is not be construed herein as limited to the functionalities by which an embodiment thereof is described and explained herein. Thus, an embodiment of the present invention is perfectly functional using, for example, another programming vehicle for displaying dynamic HTML page content, such as Active Server Pages (ASP) by Microsoft, Inc., along with or instead of an actual JSP.

JSP JSP-S may be compiled into bytecode, e.g., into a servlet, e.g., servlet SV, upon recognition by server 100S. Importantly, JSP JSP-S can also call helper classes H, also deployed by server 100S, to provide additional processing.

A step down in programming hierarchy 400 from JSP JSP-S are servlets SV, a Java application. Servlet SV runs, in one embodiment, within a web server (e.g., web server WS; FIG. 2). Running thereon, servlet SV effectuates server-side processing. In various embodiments of the present invention, such processing may include the accessing of a database (e.g., database 340; FIG. 3) and/or to perform processing related tasks in an electronic commerce milieu (e.g., e-commerce environment 300; FIG. 3).

Again, the present invention is well suited to the application of functionalities similar to those by which an embodiment of the present invention is described and explained herein. The present invention is not be construed herein as limited to the functionalities by which an embodiment thereof is described and explained herein.

Thus, an embodiment of the present invention is perfectly functional using, for example, another programming vehicle for providing server side processing other than an actual servlet. In another embodiment therefore, server side processing may be performed by a Common Gateway Interface (CGI) script, implemented in C, C++, and/or in PERL, another extraction and report language, or another vehicle with efficient string handling capabilities, to achieve the functions as provided by an actual servlet of the present embodiment.

Below servlets SV in hierarchy 400 are helper classes H. Helper classes H effectuate additional processing. Importantly, helper classes H may be called by JSP JSP-S. Helper classes H may include such functionalities as Enterprise JavaBeans (EJB). The helper classes H are independent Java program modules that are called for and executed as needed for the performance of specific tasks.

At the low end of the hierarchical structure 400 are business objects BO. Business objects BO are, in one embodiment, independent object-oriented Java program modules. In another embodiment, business objects BO may be written in any object-oriented programming language. Business objects BO, as modules, work together at runtime with no prior linking and/or precompilation as a group. Business objects BO work together on the platform running various embodiments of the present invention, and interoperate strictly via the messages passed between them.

Exemplary Functional Relationships

Figure 5A:
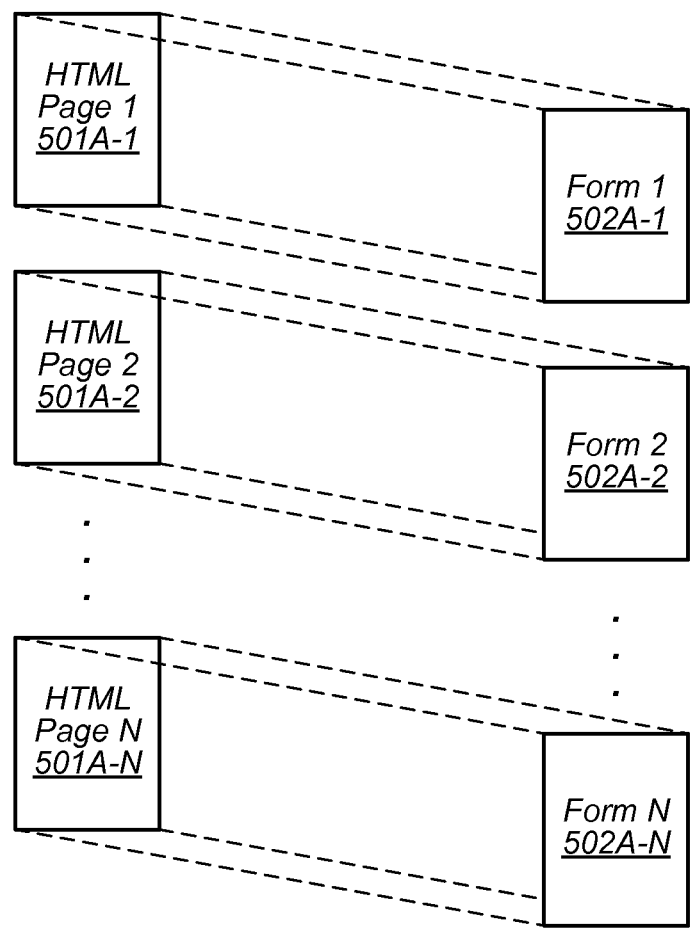
FIG. 5A is a block diagram depicting a relationship between forms and HTML pages, in accordance with an embodiment of the present invention.

With reference to FIG. 5A, a relationship 500A is depicted between a series of HTML pages 501A-1 through 501A-N and a corresponding series of forms 502A-1 through 502A-N, respectively. Information displayed to a user through various embodiments of the present invention may be promulgated in HTML as a webpage, or similar HTML page implementation. Every HTML page has a corresponding form associated with it. In the present example, there are a number N of HTML pages 501A-1 through 501A-N. N may be any positive whole number.

The forms 502A-1 through 502A-N may represent, in one embodiment, business forms as displayed on a user's monitor (e.g., display 112C; FIG. 2). The forms 502A-1 through 502A-N are encoded in HTML for display on the monitor as the corresponding HTML pages 501A-1 through 502A-N. HTML page 1, 501A-1 is associated with Form 1, 502A-1. Similarly, HTML page 2, 501A-2 is associated with Form 2, 502A-2. This relationship holds for each number of the correspondence 500A, up to and including N, such that HTML page N, 501A-N is associated with Form N, 502A-N.

Figure 5B:
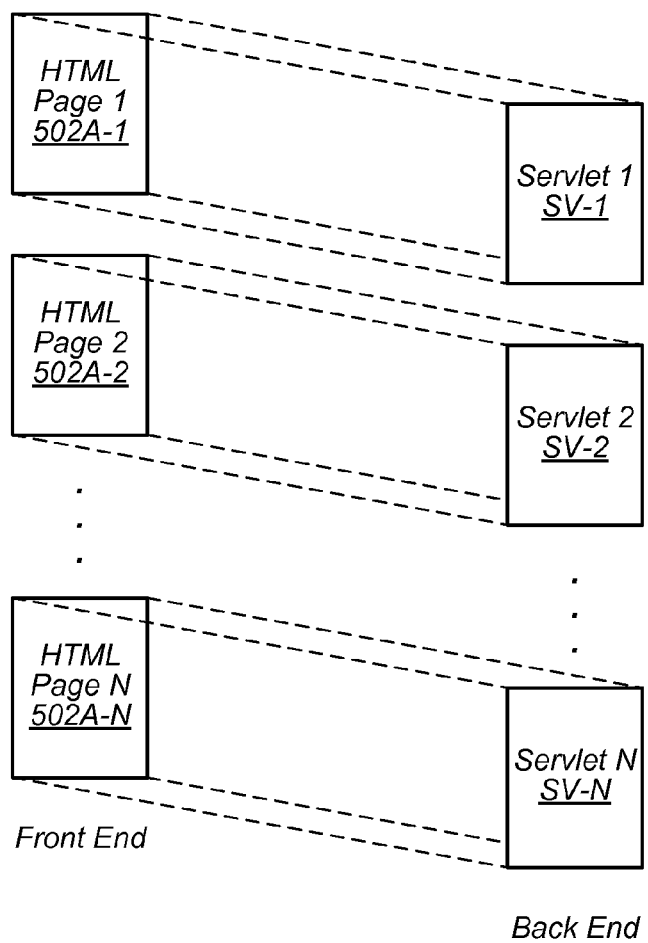
FIG. 5B is a block diagram depicting a mapping between forms and servlets, in accordance with an embodiment of the present invention.

Referring now to FIG. 5B, a relationship 500B is depicted between the series of forms 502A-1 through 502A-N and a corresponding series of servlets SV-1 through SV-N. It is seen that servlets SV-1 through SV-N reside in the backend of the relationship, e.g., are resident in a server (e.g., server 100S, FIGS. 2, 3, 6). In the present example, there are a number N of forms 502A-1 through 502A-N, wherein N may be any positive whole number. Thus, it is appreciated that relationship 500B is reflective, in the present exemplary embodiment, to relationship 500A (FIG. 5A). In other embodiments, there may be similarity between the relationships 500A and 500B, or there may be differences.

Each and every form 502A-1 through 502A-N is mapped to a servlet in the backend. As in relationship 500A (FIG. 5A), the forms 502A-1 through 502A-N represent, in one embodiment, business forms as displayed on a user's monitor (e.g., display 112C; FIG. 2). The forms 502A-1 through 502A-N are encoded in HTML for display on the monitor (e.g., as the corresponding HTML pages 501A-1 through 502A-N; FIG. 5A). Form 1, 502A-1 is associated with Servlet 1, SV-1. Similarly, Form 2, 502A-2 is associated with Servlet 2, SV-2. This relationship holds for each number of the correspondence 500B, up to and including N, such that Form N, 502A-N is associated with Servlet N, SV-N.

Figure 5C:
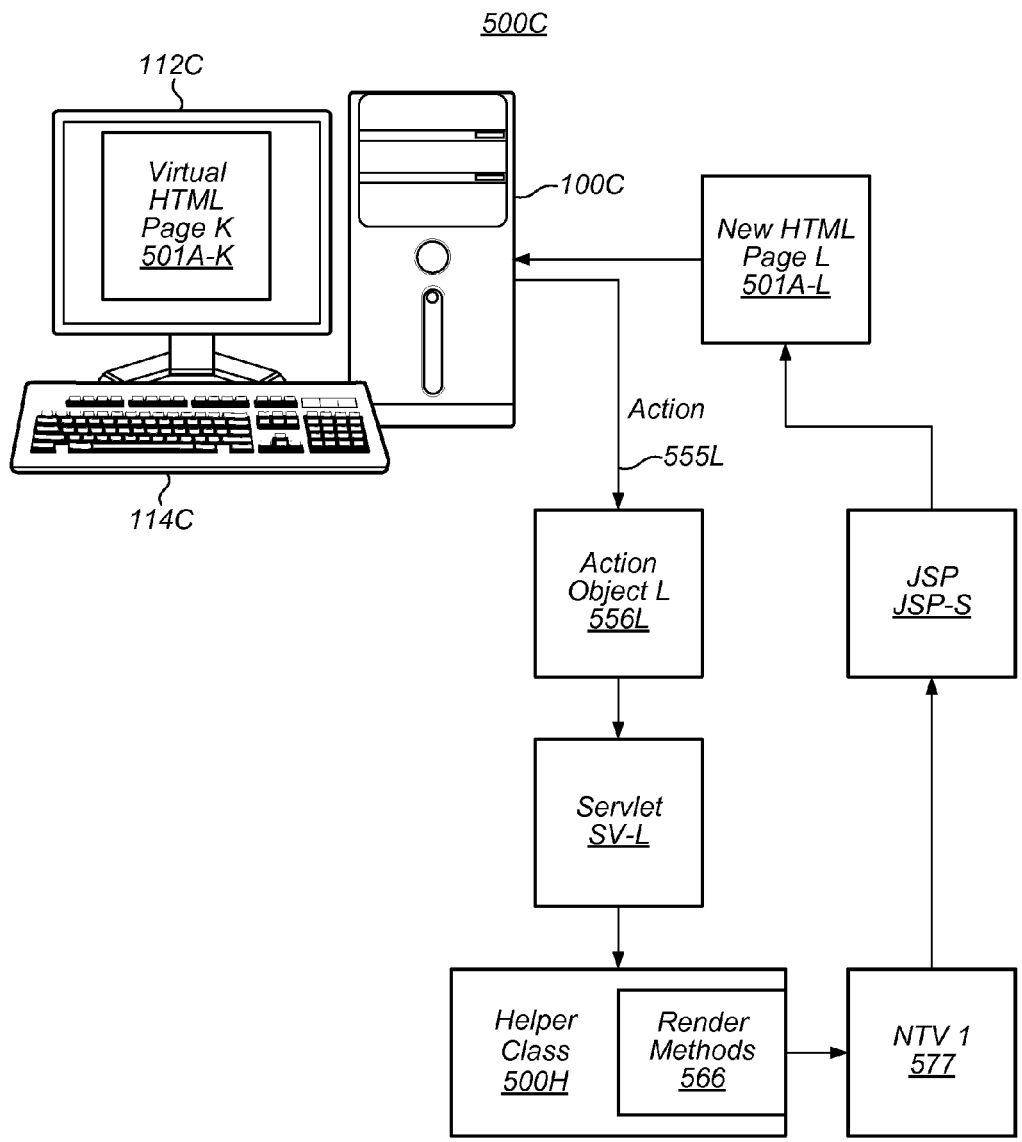
FIG. 5C is a block diagram of a first data flow between functionalities, in accordance with an embodiment of the present invention.

Referring now to FIG. 5C, a relationship 500C is depicted between a number of functions and actions, in accordance with one embodiment of the present invention. A user at a client computer 100C views information displayed on a monitor 112C, formatted as a virtual HTML page K, 502A-K. HTML page K, 501A-K corresponds to a form 502A-K (not shown directly, but correspondingly similar to, and within the series of forms 502A-1 through 502A-N; FIG. 5A), which in one implementation is a business form, such as an e-commerce order form. Such an order form may have a number of fields, such as address fields, to be filled out electronically by a user input.

The user implements an action L, 555L, such as to fill in a field on the on-screen displayed form with address information, by making some input to client computer 100C. Such an input may be made in a number of ways. The input may be made through a GUI and a mouse click (e.g., using control 116; FIG. 1). It may also be made via a touch-sensitive screen, if monitor 112C and computer system 100C is so capable, or by any other input-effectuating functionality. One common method of input is via an alphanumeric and/or character-based input functionality, such as keyboard 114C in the present exemplary embodiment.

Action L, 555L has a corresponding action object L, 556L which communicates the object of action L, 555L, to Servlet SV-L. In one embodiment, virtually each and every action 555 has a corresponding action object 556 which is communicated to a corresponding servlet SV. The servlet, in the present example Servlet SV-L, does an appropriate programmed action corresponding to the object of the action, here action object L, 556L, thus based on the user input, e.g., upon the key or button pressed on keyboard 114C.

In taking its corresponding action, Servlet SV-L calls a set of helper class methods. Importantly, the methods in these helper class methods 500H are re-usable for a variety of actions. Advantageously, this reduces redundancy in code required to implement the programming for relationship 500C.

Figure 5D:
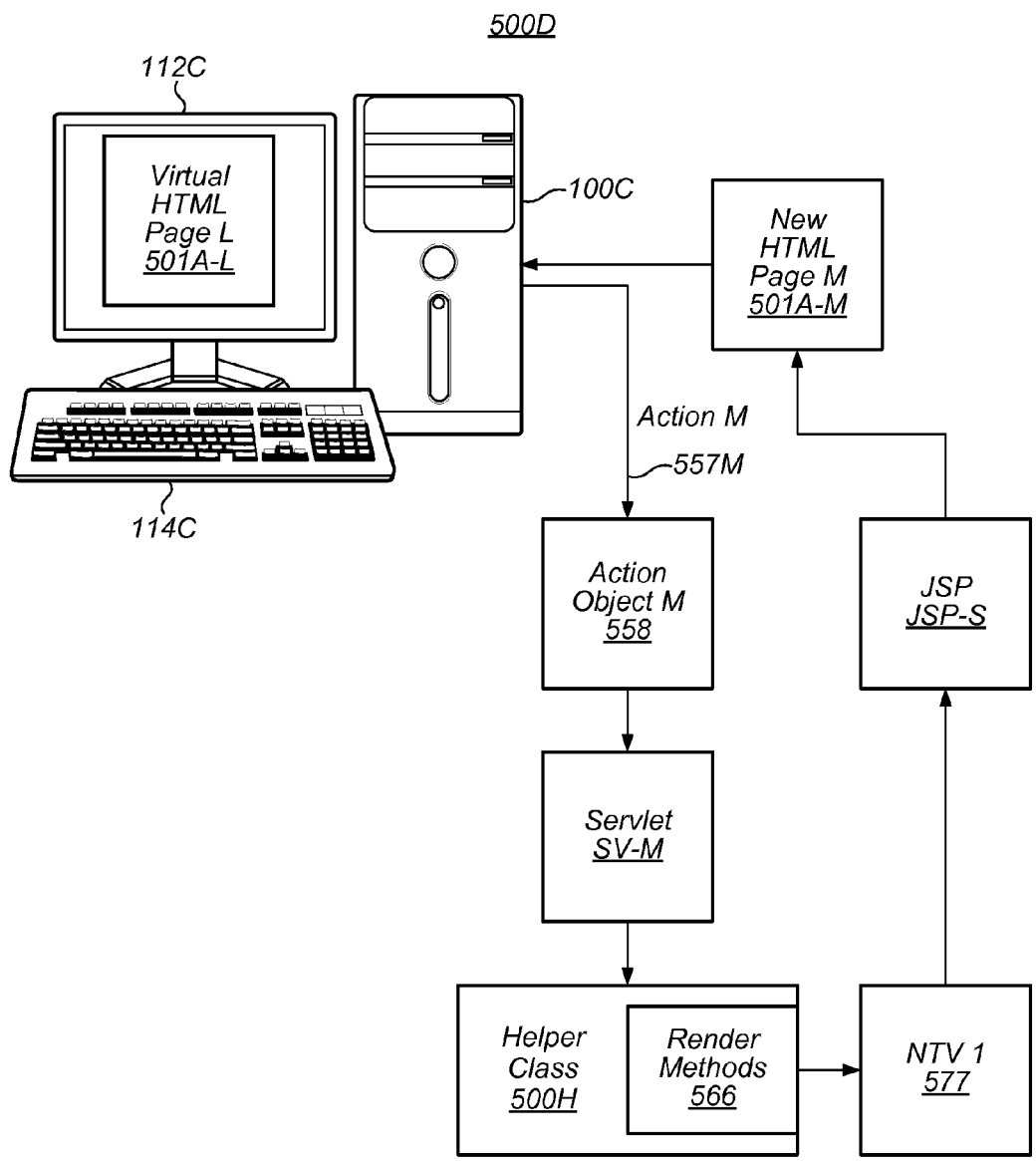
FIG. 5D is a block diagram of a subsequent data flow between functionalities, in accordance with an embodiment of the present invention.

Once the processing of the action 555L is complete, Servlet SV-L calls a render method within render methods 566. Render methods 566 are in helper class 500H. Render methods 566 assist in promulgating a new HTML page L (e.g., HTML page L, 501A-L; FIG. 5D) based on the processing of action 555L of the "previous" screen, e.g., virtual HTML page K, 501A-K. The promulgation assistance is provided by the render methods 566 in the following manner.

In render methods 566, the specific render method called up by servlet SV-L internally calls related render methods also within render methods 566 to populate data in a name value pair (NTV) 577. The NTV 577 formats the data required by the JSP JSP-S. JSP JSP-S then directly promulgates a new HTML page L, 501A-L, using the data provided to it by NTV 577. The newly promulgated HTML page L, 501A-L, is then made available to client computer 100C for display to the user (e.g., FIG. 5D).

Referring now to FIG. 5D, a relationship 500D is depicted between a number of functions and actions, in accordance with one embodiment of the present invention. In FIG. 5D, it is seen that virtual HTML page L, 501A-L, is displayed on monitor 112C, having replaced virtual HTML page K, 502A-K (FIG. 5C). Virtual HTML page L, 501A-L corresponds to a form 502A-L (not shown directly, but correspondingly similar to, and within the series of forms 502A-1 through 502A-N; FIG. 5A), which in one implementation is also a business form, such as an e-commerce order form. Like the previous corresponding form 502A-K discussed above, such an order form may also have a number of fields, such as address fields, to be filled out electronically by a user input.

In the present example, viewing HTML page L, 501A-L a user at client computer 100C inputs another action, action M, 557M, such as through a keystroke on keyboard 114C, or by any other effective means (e.g., GUI and control 116; FIG. 1, etc.). Action M, 557M has another action object M, 558, which may be to fill in another address data field, different perhaps from the field filled out by action object L (FIG. 5C). This can reflect, in the present example, the different address field business forms require, such as the differing addresses for shipping, billing, paying, sending, etc. (e.g., shipTo, billTo, payTo, sendTo, etc.), or different lines of data, such as number, unit, street, city, state, zip code, country, etc.

The action object M, 556M, corresponding to action M, 555M communicates the object of action M, 555M, to corresponding Servlet SV-M. The servlet, in the present example Servlet SV-M, does an appropriate programmed action corresponding to the object of the action, here action object M, 556M, thus based on the user input, e.g., upon the key or button pressed on keyboard 114C.

In taking its corresponding action, Servlet SV-M calls a set of helper class methods. Importantly, the methods in these helper class methods 500H are re-usable from the previous (e.g., FIG. 5C) and other actions. Advantageously, this reduces redundancy in code required to implement the programming for relationship 500D, and others.

Once the processing of the action 555M is complete, Servlet SV-M calls a render method within render methods 566. Render methods 566 are in helper class 500H. Render methods 566 assist in promulgating a new HTML page M (e.g., HTML page M, 501A-M; FIG. 5D) based on the processing of action 555M of the "previous" screen, e.g., virtual HTML page L, 501A-L. The promulgation assistance is provided by the render methods 566 in the following manner, in one embodiment, in the manner discussed above.

In render methods 566, the specific render method called up by servlet SV-M internally calls related render methods also within render methods 566 to populate data in a name value pair (NTV) 577. The NTV 577 formats the data required by the JSP JSP-S. JSP JSP-S then directly promulgates a new HTML page M, 501A-M, using the data provided to it by NTV 577. The newly promulgated HTML page M, 501A-M is then made available to client computer 100C for display to the user.

The reduction in code redundancy is evident in the similarities between the schemes discussed with reference to FIGS. 5C and 5D, and the use of the same helper classes, render methods, NTVs, and JSPs.

Figure 6:
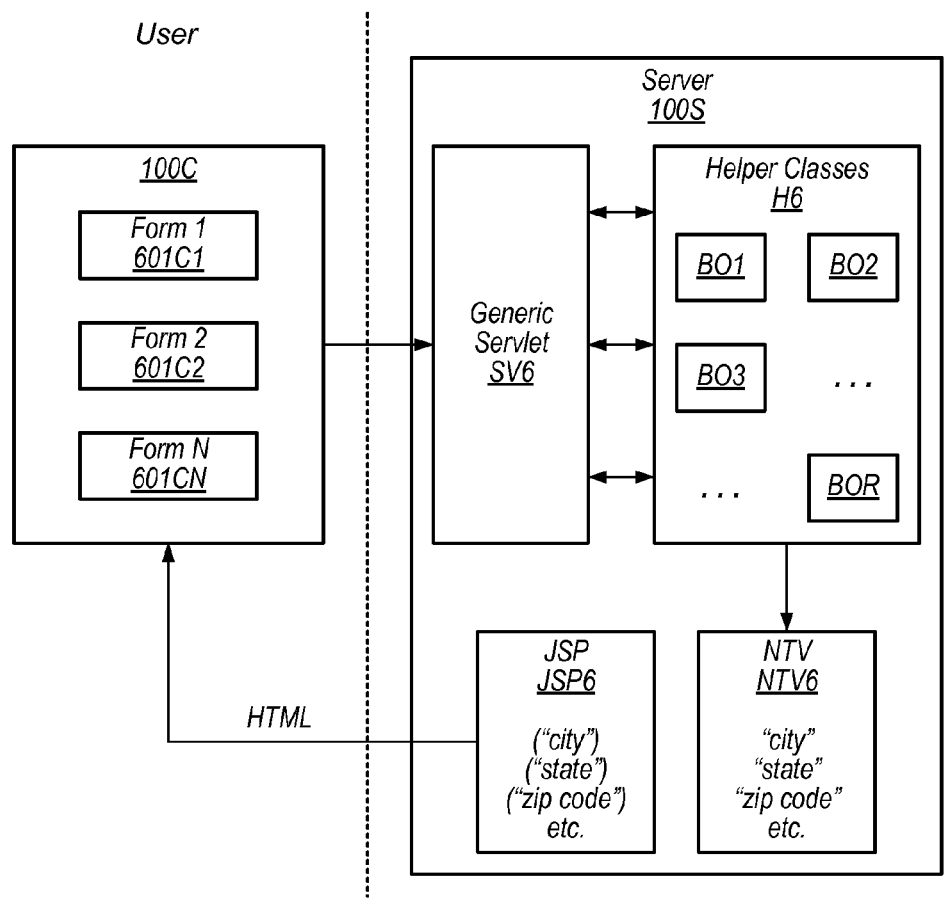
FIG. 6 is a block diagram of a functional relationship between system hardware and software components, in accordance with an embodiment of the present invention.

With reference to FIG. 6, a client computer 100C on a user's end has a number of HTML pages 1-N, 601C1 through 601CN, respectively. In one embodiment, user actions on these HTML pages 601C1 through 601CN are conveyed to corresponding servlets, shown in the present example as a single generic servlet SV6. Servlet SV6 resides on server 100S.

Every HTML page 1-N, 601C1 through 601CN, respectively, has a form (e.g., forms 502A-1 through 502AN, respectively; FIG. 5A) associated with it. These forms represent, in one embodiment, business forms. The forms are encoded in HTML for display (e.g., as the corresponding HTML pages 501A-1 through 502A-N; FIG. 5A; e.g., displayed upon a monitor such as monitor 112C, FIGS. 1, 5C, 5D). The forms are each mapped to corresponding servlets, represented in the present example by generic servlet SV6 in the backend, e.g., on server 100S.

The servlet SV6 takes appropriate action based upon a user input. Each such action calls a set of helper class methods H6, also on server 100S. The methods in these helper classes are re-usable for various actions. In one embodiment, among the helper class methods H6 are a number R of business class objects BO1 through BOR. Business objects BO1 through BOR are associated, in one embodiment, with independent object-oriented Java program modules. In anther embodiment, business objects BO1 through BOR may be written in any object-oriented programming language. Business objects BO1 through BOR, as modules, work together at runtime with no prior linking and/or precompilation as a group. Business objects BO1 through BOR work together on the platform running various embodiments of the present invention, and interoperate strictly via the messages passed between them.

Business objects BO1 through BOR, in one embodiment, may be associated and/or identified with render methods (e.g., render methods 566; FIGS. 5C, 5D). Upon completion of processing associated with the action based on the user input, servlet SV6 calls upon a render method used to create a new HTML page, based upon the processing of a foregoing HTML page, previously displayed to the user at client computer 100C, e.g., upon a monitor (e.g., monitor 112C, FIGS. 1, 5C, 5D). The render method calls other render methods in helper classes H6, as necessary, to populate data in an NTV, NTV6.

These data may include information important to completion of order forms and other business forms, such as address data, including, for example, "city," "state," "zip code," etc. Such data is required and used by JSP JSP6 for generating a new HTML page called for by the user input. The HTML so generated is fed to client computer 100C in an HTML format for display to the user as the new HTML page.

Exemplary Method

Figure 7:
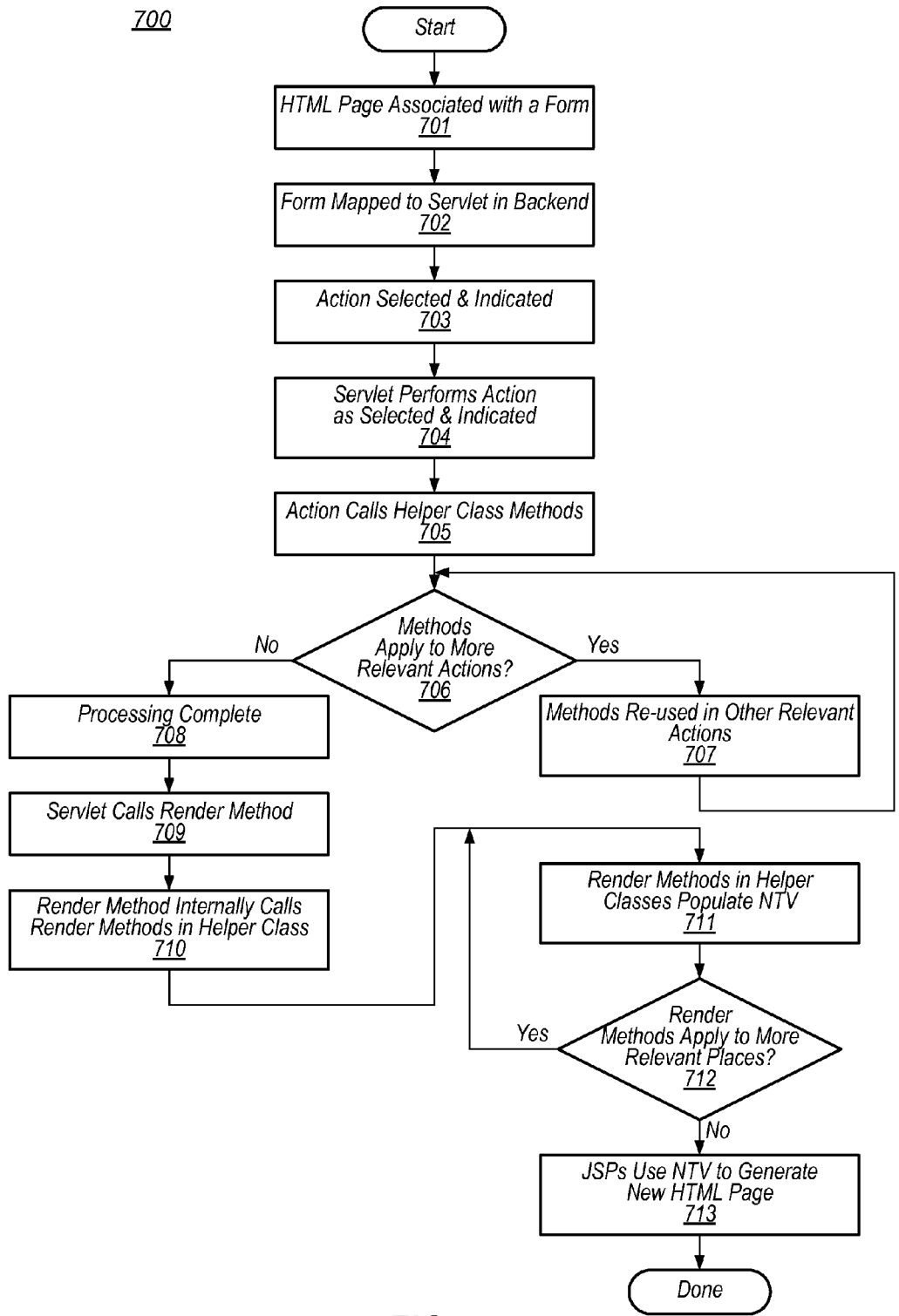
FIG. 7 is a flow chart of a method for generating a new HTML page, in accordance with an embodiment of the present invention.

An embodiment of the present invention is discussed in terms of a process, e.g., the implementation and/or execution of a method. FIG. 7, a flowchart, and the text herein rendering an accompanying discussion thereof, refers to a process 700 performed in accordance with one embodiment of the present invention for generating a webpage or similar page coded in HyperText markup language, hereinafter referred to in abbreviation as HTML. Flowchart 7, its depicted process 700, and the text herein rendering an accompanying discussion thereof, includes exemplary processes of an embodiment of the present invention which, in one embodiment, are carried out by processors and electrical/electronic components under the control of computer readable and computer executable instructions.

The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific processes are disclosed in flowchart 7 and its Process 700, and the text rendering an accompanying discussion thereof herein, such processes are exemplary. That is, embodiments of the present invention is well suited, to performing various other processes or variations of the processes recited in FIG. 7, and the text rendering an accompanying discussion thereof. Within the present embodiment, it should be appreciated that the process of flowchart 700, and the text rendering an accompanying discussion thereof, may be performed by, e.g., executed upon software, firmware, and/or hardware or any combination of software, firmware, and/or hardware.

With reference now to FIG. 7, a process 700 for generating HTML pages, in accordance with one embodiment of the present invention, is described. Process 700 begins with step 701, wherein an HTML page (e.g., HTML page 2, 501A2; FIG. 5A) is associated with a form (e.g., form 2, 502A2; FIG. 5A). These forms represent, in one embodiment, business forms. The forms are encoded in HTML for display (e.g., as the corresponding HTML pages 501A-1 through 502A-N; FIG. 5A; e.g., displayed upon a monitor such as monitor 112C, FIGS. 1, 5C, 5D).

In step 702, the forms, corresponding to the HTML pages are mapped to servlets (e.g., servlets SV-1 through SV-N) in the backend, e.g., deployed upon a server (e.g., server 100S; FIGS. 2, 6).

An action (e.g., actions 555L, 555M; FIGS. 5C, 5D, respectively) is selected and indicated, e.g., inputted; step 703. For example, a user implements an action, such as to fill in a field on an on-screen displayed form with address information, by making some input to a computer (e.g., client computer 100C, FIGS. 1, 2, 5C, 5D, 6).

The action is communicated to the corresponding servlet. The servlet performs an appropriate programmed action, as selected and indicated by the user in step 704.

In step 705, the action calls helper class methods (e.g., helper class methods 500H, H6; FIGS. 5C, 5D, and FIG. 6, respectively).

One major advantage of embodiments of the present invention is that modularity and re-usability of resources reduces code redundancy, with a variety of concomitant benefits. Thus, in step 706, it is determined whether the helper class methods called apply to more relevant actions.

If it is decided in step 706 that the helper class methods called apply to more relevant actions, the methods are re-used accordingly; step 707. Step 706 is then repeated.

If, on the other hand, it is determined in step 706 that either no more relevant actions are necessary, or that the previously selected (step 705) helper class methods are not, for some reason, further applicable, process 700 proceeds to step 708, wherein processing based on the action taken (step 703) on the previously displayed screen associated with a form (step 701) is complete.

Then, in step 709, the servlet calls a render method (e.g., render methods 566; FIGS. 5C, 5D).

The render method called then internally calls other render methods in helper classes (e.g., helper class 500H; FIGS. 5C, 5D; helper classes H6; FIG. 6); step 710.

In step 711, the render methods in the helper classes populate name value pairs (NTV), e.g., NTV1, 577; FIGS. 5C, 5D; NTV6; FIG. 6).

In step 712, it is decided whether the render methods apply to more relevant places.

If it is decided in step 712 that the render methods apply to more relevant places, the render methods are re-used accordingly. Step 711 is then repeated accordingly.

If, on the other hand, it is determined in step 712 that the previously selected (step 710) render methods are not, for some reason, further applicable, process 700 proceeds to step 713, wherein a JSP (e.g., Java Server Page) or equivalent technology (e.g., ASP) uses data in the NTV to generate a new HTML page. At this point, process 700 is complete.

In summary, an embodiment of the present invention modularizes various parts of an HTML page. This modularization effectuates the re-use of certain portions of code. Advantageously, re-use of code portions needed to implement the HTML page reduces redundancy, which would otherwise be inherent in the coding. Reduction in coding redundancy achieves significant reductions in burdens imposed on implementing systems, such as computer systems implementing the order operations and other aspects of electronic commerce. This achievement improves the efficiency of these implementing systems, increasing the speed with which they can handle the order operations, and their capacity for data handling and other functions.

In one embodiment, the present invention associates each HTML page with an electronically based form. In one embodiment, the form associated with the HTML page is mapped to a servlet in a system backend. The form associated with the HTML page may also be mapped to any other similarly effective Java application running in a web server or application server providing server-side processing accessing a database and/or performing electronic commerce processing.

The servlet performs appropriate action based on a corresponding user action on the front side, e.g., at a client computer, such as certain keyboard or GUI inputs. In one embodiment, each user action calls a set of helper class methods. Advantageously, the methods in these helper classes are re-usable for various other actions, as well.

Upon completion of processing associated with the corresponding operation of the helper classes, the servlet calls a render method. The render method called correspondingly creates a new page in HTML, based on the processing of the previous screen, by which the user actions were inputted.

In one embodiment, the active render method internally calls render methods in helper classes. The render methods in the helper classes so called populate data in a name value pair (NTV). The NTV promulgate data, which are utilized by a JSP for generating a new HTML page, one which will effectuate the order operation, accordingly. Advantageously, the render methods in helper classes are re-used in a number of other places.

Although particular embodiments of the present invention have been shown and described, it will be obvious to those skilled in the art that changes and modifications can be made without departing from the present invention in its broader aspects. For example, a variety of programming languages can be used to implement the present invention, such as the well-known JAVA programming language, C++ programming language, C programming language, PERL, other languages, or any combination thereof. Also, the present invention can be used with a variety of multimedia communication environments, such as the well-known HTML or VRML environments, and a variety of protocols, such as the standard HTTP or SSL protocols. Therefore, the pending claims are to encompass within their scope all such changes and modifications that fall within the true scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method, comprising:
a server computer providing a first page in a high order presentation language to a client computer for display, wherein the first page is associated with an electronic form of an application currently executing on at least the server computer and comprises an encoding of said electronic form, wherein said electronic form is one of a plurality of electronic forms associated with respective pages, wherein each of the plurality of electronic forms is mapped to a respective one of a plurality of server-side processing components for processing user input received for the respective electronic form, wherein each of the server-side processing components is deployed upon the server computer, and wherein at least two of the electronic forms are mapped to different respective ones of the plurality of server-side processing components, such that user input for different electronic forms is processed by different respective ones of the server-side processing components;
the server computer receiving input indicating a user action that is performed on the first page and that represents an action to be implemented on the electronic form of the currently executing application that is associated with the first page; and
in response to said receiving:
the respective one of the plurality of server-side processing components that is mapped to the electronic form that is associated with the first page generating a second page in a high order presentation language; and
the respective one of the plurality of server-side processing components that is mapped to the electronic form that is associated with the first page providing the second page to the client computer for display;
wherein said generating the second page comprises:
calling a helper class method corresponding to the action to be implemented on the electronic form;
calling a corresponding render method;
in response to said calling a helper class method, said helper class method performing the action on the electronic form; and
in response to said calling a corresponding render method and dependent on the performance, by the helper class method, of the action on the electronic form, said render method performing:
populating a name value pair with corresponding data;
applying said name value pair populated with said data to a vehicle for displaying dynamic content on pages in a high order presentation language; and
drafting said second page;

wherein the method further comprises:
the server computer receiving input indicating a second user action that represents a second action to be implemented on another electronic form of the application currently executing on at least the server computer; and
in response to receiving the input indicating the second user action, a different one of the plurality of server-side processing components that is mapped to the other electronic form generating another page in a high order presentation language, wherein said generating another page comprises calling at least one of the same said helper class method and the same said render method that was called for said generating the second page such that the respective one and the different one of the plurality of server-side processing components both call the same at least one of the said helper class method and said render method for generating the second page and the other page, respectively.

2. The method as recited in claim 1, wherein said high order presentation language comprises HyperText Markup Language (HTML).

3. The method as recited in claim 1, wherein said first page, said second page, and said pages comprise HTML pages.

4. The method as recited in claim 1, wherein each of said plurality of server-side processing components comprises a servlet.

5. The method as recited in claim 1, wherein said form comprises a business form.

6. The method as recited in claim 5, wherein said business form comprises a modality for performing an electronic commerce transaction.

7. The method as recited in claim 1, wherein said vehicle for displaying dynamic content on pages in a high order presentation language comprises a Java Server Page (JSP).

8. A non-transitory, computer-readable storage medium storing program instructions computer-executable to implement a plurality of server-side processing components each configured to:
receive input indicating a user action that is performed on a first page in a high order presentation language, wherein the first page is associated with an electronic form of a currently executing application and comprises an encoding of said electronic form, wherein said electronic form is one of a plurality of electronic forms associated with respective pages, wherein each of the plurality of electronic forms is mapped to a respective one of the plurality of server-side processing components, wherein the plurality of server-side processing components process user input received for the respective electronic form, each wherein at least two of the electronic forms are mapped to different respective ones of the plurality of server-side processing components, such that user input for different electronic forms is processed by different respective ones of the server-side processing components, and wherein the user action represents an action to be implemented on the electronic form of the currently executing application that is associated with the first page;
wherein in response to said receiving, the respective one of the plurality of server-side processing components that is mapped to the electronic form that is associated with the first page is configured to:
generate a second page in a high order presentation language; and
provide the second page to a client for display;
wherein said generating the second page comprises:
calling a helper class method corresponding to the action to be implemented on the electronic form; and
calling a corresponding render method;
wherein said program instructions are further executable to implement said helper class method, and wherein said helper class method is configured to, in response to said calling the helper class method, perform the action on the electronic form; and
wherein said program instructions are further executable to implement said render method, and wherein said render class method is configured to perform, dependent on the performance, by the helper class method, of the action on the electronic form:
populating a name value pair with corresponding data;
applying said name value pair populated with said data to a vehicle for displaying dynamic content on pages in a high order presentation language; and
drafting said second page;
wherein a different one of the plurality of server-side processing components that is mapped to another electronic form of a currently executing application is configured to:
receive input indicating a second user action that represents a second action to be implemented on the other electronic form; and
in response to said receive input indicating a second user action, generate another page in a high order presentation language, wherein said generating another page comprises calling at least one of the same said helper class method and the same said render method that was called for said generating the second page such that the respective one and the different one of the plurality of server-side processing components both call the same at least one of the said helper class method and said render method for generating the second page and the other page, respectively.

9. The storage medium as recited in claim 8, wherein said high order presentation language comprises HyperText Markup Language (HTML).

10. The storage medium as recited in claim 8, wherein said first page, said second page, and said pages comprise HTML pages.

11. The storage medium as recited in claim 8, wherein each of said plurality of server-side processing components comprises a servlet.

12. The storage medium as recited in claim 8, wherein said form comprises a business form.

13. The storage medium as recited in claim 12, wherein said business form comprises a modality for performing an electronic commerce transaction.

14. The storage medium as recited in claim 8, wherein said vehicle for displaying dynamic content on pages in a high order presentation language comprises a Java Server Page (JSP).

15. A system, comprising:
a server computer on which a plurality of server-side processing components are deployed;
wherein the server computer is configured to:
provide a first page in a high order presentation language to a client computer for display, wherein said first page is associated with an electronic form of an application currently executing on at least the server computer and comprises an encoding of said electronic form, wherein said electronic form is one of a plurality of electronic forms associated with respective pages, wherein each of the plurality of electronic forms is mapped to a respective one of the plurality of server-side processing components for processing user input received for the respective electronic form, wherein each of the server-side processing components is deployed upon the server computer, and wherein at least two of the electronic forms are mapped to different ones of the plurality of server-side processing components, such that user input for different electronic forms is processed by different respective ones of the server-side processing components; and receive input indicating a user action that is performed on the first page and that represents an action to be implemented on the electronic form of the currently executing application that is associated with the first page;

wherein in response to said receiving, the respective one of the plurality of server-side processing components that is mapped to the electronic form that is associated with the first page is configured to implement:

generating a second page in a high order presentation language; and providing the second page to the client computer for display;

wherein said generating the second page comprises:

calling a helper class method corresponding to the action to be implemented on the electronic form;

calling a corresponding render method;

in response to said calling a corresponding render method, said helper class method performing the action on the electronic form; and in response to said calling a corresponding render method and dependent on the performance, by the helper class method, of the action on the electronic form, said render method performing:

populating a name value pair with corresponding data;

applying said name value pair populated with said data to a vehicle for displaying dynamic content on pages in a high order presentation language; and drafting said second page;

wherein the server computer is further configured to receive input indicating a second user action that represents a second action to be implemented on another electronic form of the application currently executing on at least the server computer; and wherein in response to receiving input indicating the second user action, a different one of the plurality of server-side processing components that is mapped to the other electronic form is configured to generate another page in a high order presentation language, wherein said generating another page comprises calling at least one of the same said helper class method and the same said render method that was called for said generating the second page such that the respective one and the different one of the plurality of server-side processing components both call the same at least one of the said helper class method and said render method for generating the second page and the other page, respectively.

16. The system as recited in claim 15, wherein said system is an electronic commerce system.

17. The system as recited in claim 15, wherein said high order presentation language comprises HyperText Markup Language (HTML).

18. The system as recited in claim 15, wherein said first page, said second page, and said pages comprise HTML pages.

19. The system as recited in claim 15, wherein each of said plurality of server-side processing components comprises a servlet.

20. The system as recited in claim 15, wherein said form comprises a business form.

21. The system as recited in claim 20, wherein said business form comprises a modality for performing an electronic commerce transaction.

22. The system as recited in claim 15, wherein said vehicle for displaying dynamic content on pages in a high order presentation language comprises a Java Server Page (JSP).

* * * * *

UNITED STATES PATENT AND TRADEMARK OFFICE
CERTIFICATE OF CORRECTION

| | | |
|---|---|---|
| PATENT NO. | : 8,990,832 B2 | Page 1 of 1 |
| APPLICATION NO. | : 10/032849 | |
| DATED | : March 24, 2015 | |
| INVENTOR(S) | : Sridatta Viswanath and David Chiu | |

It is certified that error appears in the above-identified patent and that said Letters Patent is hereby corrected as shown below:

On the Title Page:

In the title, item (54), please delete the word "MANGEMENT" and insert --MANAGEMENT-- in place thereof.

Signed and Sealed this
First Day of March, 2016

Michelle K. Lee
*Director of the United States Patent and Trademark Office*